US009587659B1

(12) United States Patent
D'Artell

(10) Patent No.: US 9,587,659 B1
(45) Date of Patent: Mar. 7, 2017

(54) HOLDER APPARATUS

(71) Applicant: Michon D'Artell, Vashon, WA (US)

(72) Inventor: Michon D'Artell, Vashon, WA (US)

(73) Assignee: Michon D'Artell, Vashon, WA (US)

( * ) Notice: Subject to any disclaimer, the term of this patent is extended or adjusted under 35 U.S.C. 154(b) by 0 days.

(21) Appl. No.: 14/837,353

(22) Filed: Aug. 27, 2015

(51) Int. Cl.
*F16M 13/02* (2006.01)
*F16B 2/10* (2006.01)
*F16B 2/18* (2006.01)

(52) U.S. Cl.
CPC .............. *F16B 2/10* (2013.01); *F16B 2/185* (2013.01); *F16M 13/02* (2013.01)

(58) Field of Classification Search
CPC ............... Y10T 24/44752; Y10T 24/15; Y10T 24/44923; Y10T 24/44769; Y10T 24/44744; Y10T 24/1498; Y10T 24/44274; Y10T 24/153; Y10T 24/3444; Y10T 24/14; Y10T 24/309; Y10T 24/344; Y10T 24/44872
USPC ....... 248/304, 305, 306, 322, 323, 324, 339, 248/316.7, 61; 24/542, 543
See application file for complete search history.

(56) References Cited

U.S. PATENT DOCUMENTS

| | | | |
|---|---|---|---|
| 1,545,377 A * | 7/1925 | Westmoreland .......... B66C 1/36 | 24/599.1 |
| 3,060,536 A | 10/1962 | La Voie | |
| 3,087,218 A | 4/1963 | Fanning, Jr. | |
| 3,100,324 A | 8/1963 | Tutino et al. | |
| 4,840,341 A | 6/1989 | Hasegawa | |
| 5,109,576 A | 5/1992 | Teekell et al. | |
| 5,159,730 A | 11/1992 | Radvin | |
| 5,165,147 A | 11/1992 | Kuo | |
| 5,878,988 A * | 3/1999 | Rakower .................. A47G 1/20 | 248/489 |
| 5,957,416 A * | 9/1999 | Sellati ..................... F16L 3/133 | 248/58 |
| 6,526,635 B2 | 3/2003 | Nasu et al. | |
| D496,256 S * | 9/2004 | Hong ............................ D8/367 | |
| 8,448,307 B2 * | 5/2013 | Mitchell ................. F16B 45/02 | 24/265 H |
| 9,032,594 B1 * | 5/2015 | Mitchell ................. F16B 45/02 | 24/303 |
| 2007/0125015 A1 * | 6/2007 | Arakawa ............... A47F 5/0006 | 52/220.6 |

FOREIGN PATENT DOCUMENTS

CN          203234518         10/2013

* cited by examiner

*Primary Examiner* — Steven Marsh
(74) *Attorney, Agent, or Firm* — Dority & Manning, P.A.

(57) ABSTRACT

An example holder apparatus includes a body portion and a gate portion. The body portion includes a first sidewall and a second sidewall that opposes the first sidewall to form a channel therebetween. The gate portion is, at least in use, physically coupled to the second sidewall of the body portion and movable between an open configuration and a closed configuration. The gate portion includes a cross-channel member that, when the gate portion is in the closed configuration, extends across an entire width of the channel to physically engage a channel-facing surface of the first sidewall or a portion of an object held between the cross-channel member and the channel-facing surface of the first sidewall. An example kit for a holder apparatus includes a body portion and a gate portion. The gate portion is selectively physically coupleable to the body portion via a snap fit.

23 Claims, 6 Drawing Sheets

HOLDER APPARATUS

FIELD

The present disclosure relates generally to an apparatus to hold objects and, more particularly, to a holder apparatus that holds objects such as clothing, towels, window curtains, shower liners, paper or photographs, and other objects in a suspended state.

BACKGROUND

Apparatuses to hold objects have had broad application to the daily life of humans throughout history. In particular, many apparatuses exist that hold objects in a suspended state. As one example, a clothespin is an apparatus which can be used to hang clothes up for drying, for example, on a clothes line or other cord. As another example, a clip—such as an alligator clip—can be used to hold objects such as clothing, towels, window curtains, shower liners, paper or photographs, or other objects in a suspended state. As one common example, clothes hangers intended to hang pants often include a pair of clips which are used to hold the pants.

Clothespins and clips typically include a biasing member—such as a spring, coil, elastic band, or resilient member—to bias the clothespin or clip toward a state in which the clothespin or clip clamps or grabs onto the object which is being held. As one example, a clothespin or a clip can include a pair of slats that have a pair of jaws at one end. The slats are pivotable relative to each other about a pivot point. In particular, in some designs a spring is placed between the slats on an opposite side of the pivot point to the pair of jaws. The spring pushes the slats outward, causing the jaws of the slats to squeeze together. In other designs an elastic band, a resilient member, or the ends of a coil can be placed around the outer surface of the slats at a position between the jaws and the pivot point. The user can press on the ends of the slats opposite the jaws to open the jaws and place an object therein. After the user ceases providing force, the elastic band, resilient member, or coil causes the jaws to retract and clamp onto the object.

However, the inclusion and reliance upon a biasing member—such as a spring, coil, elastic band, or resilient member—to bias the apparatus toward a state in which the object is held represents a major drawback for such apparatuses. In particular, biasing members are highly susceptible to degradation or loss of functionality over time. For example, a metal spring or rubber band may lose its potency after it is repeatedly stretched or may simply lose its resilient force as it ages and the material corrodes. Thus, apparatuses which rely upon a biasing member to effectively hold objects typically have a limited life span. Such is particularly true for apparatuses which contain low cost or cheap components—which are typically used in large scale manufacturing of simple devices such as clothespins.

Likewise, clothespins or clips that include a pair of slats held together only by the ends of a metal spring or coil may become easily and accidentally disassembled. For example, the end of the metal coil may slide off of one or both of the slats, requiring the user to perform an onerous repair process for an apparatus that should operate in a simple and reliable fashion.

Other example apparatuses to hold objects range from simple hooks (e.g., coat or towel hooks) to shower or window curtain hooks and other apparatuses. Simple hooks such as towel hooks have the drawback that an object can easily slide off the hook if it is not precisely placed onto the hook or if the hook or object is disturbed (e.g., by the opening of a bathroom door on which the hook is mounted). Further, simple hooks typically cannot hold less deformable objects such as paper, photographs, artwork, etc.

Shower or window curtain hooks typically require holes or openings to the punched or formed within the shower or window curtain. For example, a shower curtain may have a number of holes formed at an upper edge. The hooks are placed around a curtain rod and then the curtain is hung from the hooks using the number of holes. One common problem experienced with this set up is that the shower curtain or shower curtain liner may be made from thin plastic material which is relatively easily torn. Once a hole at the upper edge of the curtain has torn, the hook no longer provides any support for that portion of the curtain. This results in the curtain undesirably sagging in certain portions without any remedy except the creation of a new, ineffective hole in the curtain by the curtain owner.

Therefore, a holder apparatus that operates in a simple and reliable fashion is desired. In particular, a holder apparatus that does not rely upon biasing members and which is capable of securely holding objects without holes is desired.

SUMMARY

Aspects and advantages of embodiments of the present disclosure will be set forth in part in the following description, or may be learned from the description, or may be learned through practice of the embodiments.

One example aspect of the present disclosure is directed to a holder apparatus. The holder apparatus includes a body portion. The body portion includes a first sidewall and a second sidewall that opposes the first sidewall to form a channel therebetween. The holder apparatus includes a gate portion that is, at least in use, physically coupled to the second sidewall of the body portion and movable between an open configuration and a closed configuration. The gate portion includes a cross-channel member that, when the gate portion is in the closed configuration, extends across an entire width of the channel to physically engage a channel-facing surface of the first sidewall or a portion of an object held between the cross-channel member and the channel-facing surface of the first sidewall.

Another example aspect of the present disclosure is directed to a kit for a holder apparatus. The kit includes a body portion of the holder apparatus. The body portion includes a first sidewall and a second sidewall that opposes the first sidewall to form a channel therebetween. The kit includes a gate portion of the holder apparatus. The gate portion is selectively physically coupleable to the second sidewall of the body portion of the holder apparatus. When the gate portion is physically coupled to the second sidewall of the body portion, the gate portion is movable between an open configuration and a closed configuration. The gate portion includes a cross-channel member that, when the gate portion is physically coupled to the second sidewall of the body portion and in the closed configuration, extends across an entire width of the channel to physically engage a channel-facing surface of the first sidewall or a portion of an object held between the cross-channel member and the channel-facing surface of the first sidewall.

Another example aspect of the present disclosure is directed to a holder apparatus. The holder apparatus includes a body portion. The body portion includes a first sidewall and a second sidewall that opposes the first sidewall to form a first channel therebetween. The body portion further includes a first hook and a second hook that extend from a top of the body portion. The first hook and the second hook are opposite a depth of the body portion to each other to form a second channel therebetween. The first hook and the second hook face in opposing directions that are respectively parallel to the second channel. The holder apparatus further includes a gate portion that is, at least in use, physically coupled to the second sidewall of the body portion and movable between an open configuration and a closed configuration. The gate portion includes a cross-channel member that, when the gate portion is physically coupled to the second sidewall and in the closed configuration, extends across an entire width of the first channel to physically engage a channel-facing surface of the first sidewall or a portion of an object held between the cross-channel member and the channel-facing surface of the first sidewall.

These and other features, aspects, and advantages of various embodiments will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of example embodiments directed to one of ordinary skill in the art is set forth in the specification, which makes reference to the following appended figures.

DETAILED DESCRIPTION

The present disclosure provides holder apparatuses useful to hold objects. In particular, the holder apparatuses of the present disclosure do not rely upon biasing members. Instead, as will be discussed further below, the holder apparatuses of the present disclosure are designed to leverage natural mechanical and gravitational forces to hold objects, eliminating the need for biasing members such as springs, coils, elastic bands, and the like. In addition, the holder apparatuses of the present disclosure are capable of securely holding objects—including less deformable objects such as paper—without requiring that holes be formed in such objects. These and other benefits will be discussed and become apparent from the description that follows. With reference now to the Figures, example embodiments of the present disclosure will be discussed in further detail.

Figure 1:
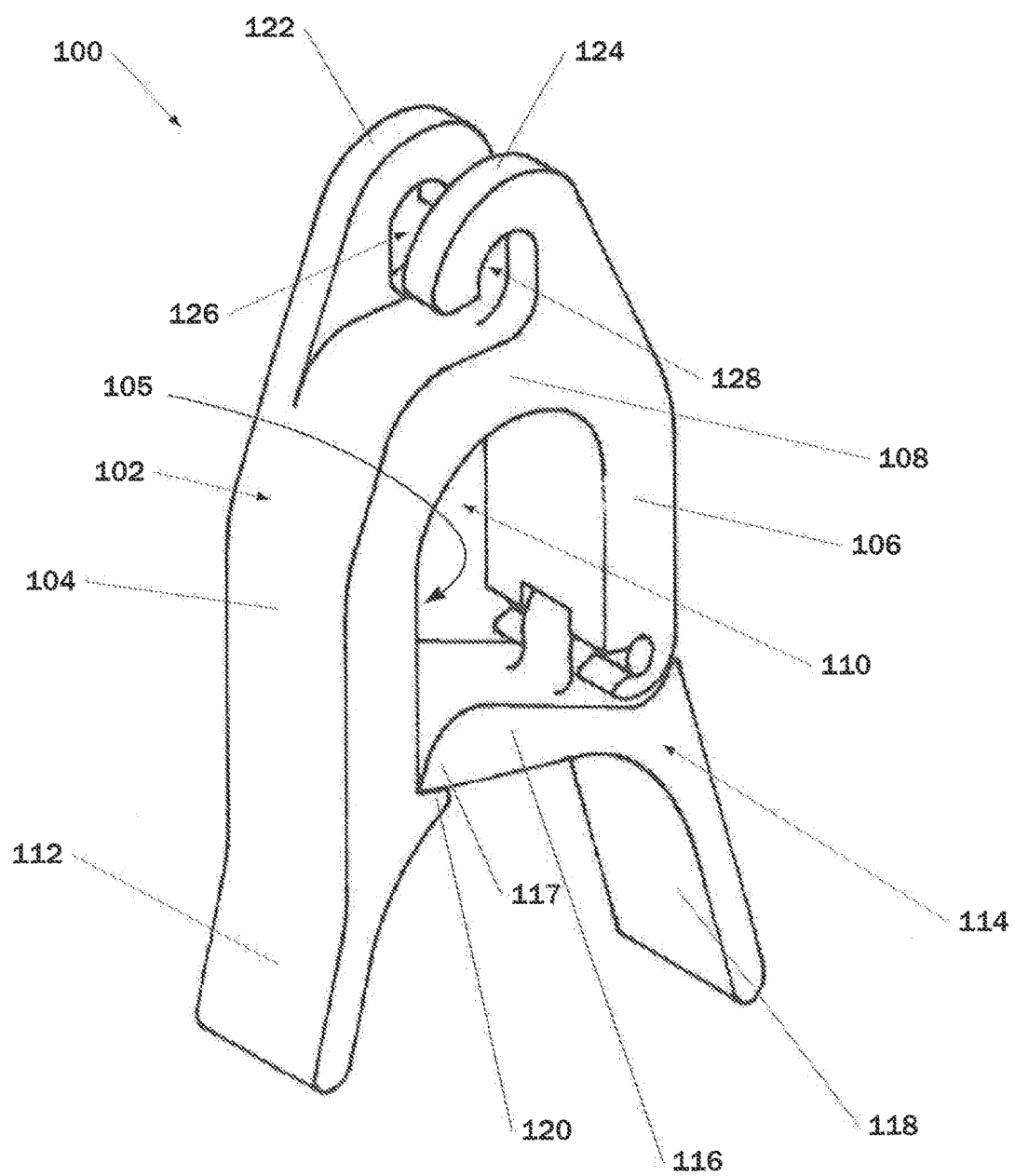
FIG. 1 depicts an isometric view of an example holder apparatus according to example embodiments of the present disclosure.
Figure 2:
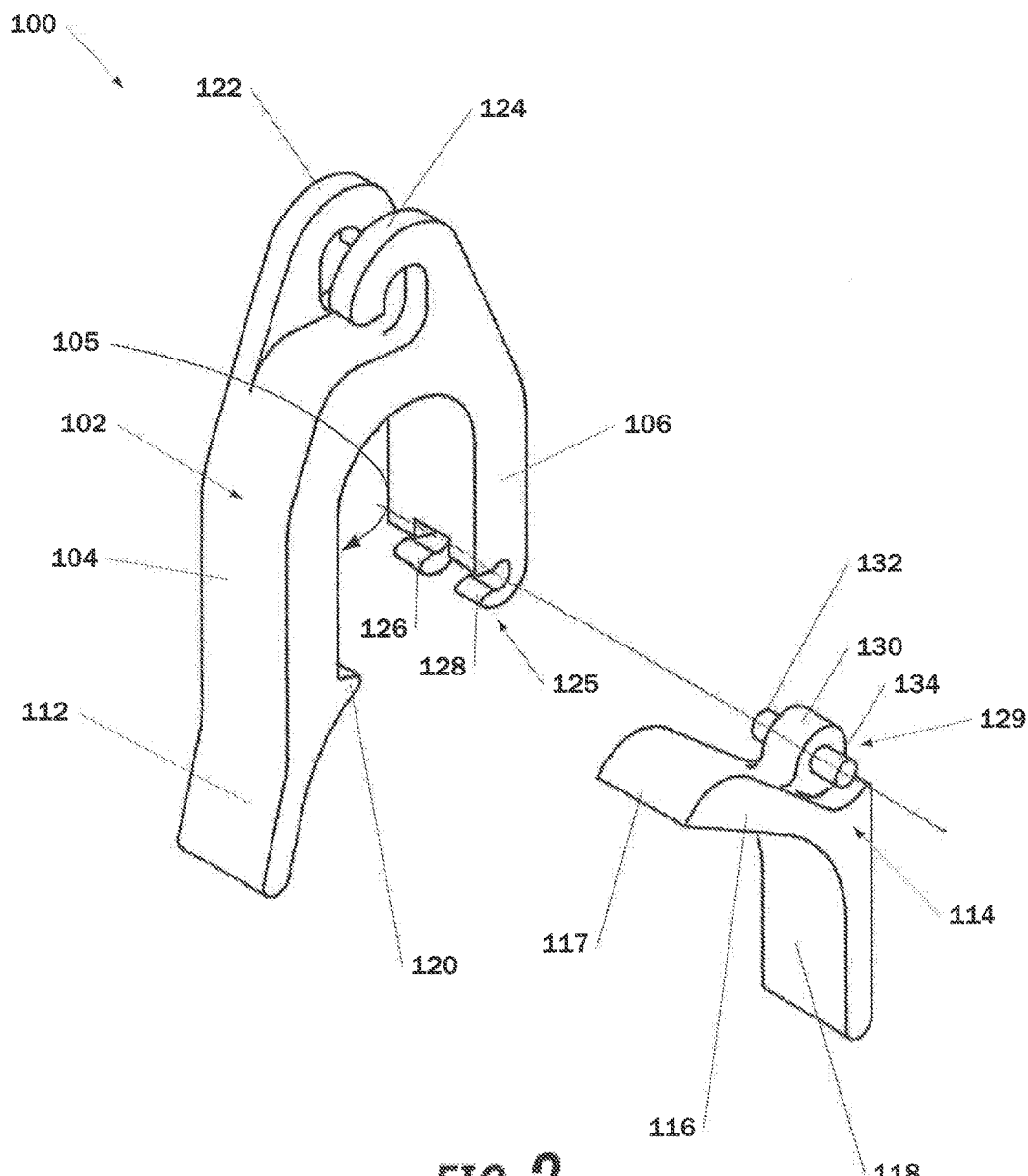
FIG. 2 depicts an exploded view of an example holder apparatus according to example embodiments of the present disclosure.

FIG. 1 depicts an isometric view of an example holder apparatus 100 according to example embodiments of the present disclosure. FIG. 2 depicts an exploded view of the example holder apparatus 100 according to example embodiments of the present disclosure.

The holder apparatus 100 includes a body portion 102 and a gate portion 114. The body portion 102 includes a first sidewall 104 and a second sidewall 106. The second sidewall 106 opposes the first sidewall 104 to form a channel 110 therebetween. During use of the holder apparatus 100, a portion of an object can be placed into and held within the channel 110.

At least in use, the gate portion 114 is physically coupled to the second sidewall 106 of the body portion 102. At least in use, the gate portion 114 is movable between an open configuration and a closed configuration. For example, the gate portion 114 can be pivotably physically coupled to the second sidewall 106 and can be pivotable between the open configuration and the closed configuration (e.g., freely pivotable). In FIG. 1, the gate portion 114 is illustrated in the closed configuration.

More particularly, the gate portion 114 can include a cross-channel member 116 that, when the gate portion 114 is in the closed configuration, extends across an entire width of the channel 110 to physically engage the first sidewall 104 or a portion of an object held between the cross-channel member 116 and the first sidewall 105. In particular, as an example, when the gate portion 114 is in the closed configuration, the cross-channel member 116 can extend across the entire width of the channel 110 to physically engage a channel-facing surface 105 of the first sidewall 104 or a portion of an object held between the cross-channel member 116 and the channel-facing surface 105 of the first sidewall 104. For example, a distal end 117 of the cross-channel member 116 can press against or otherwise physically engage the channel-facing surface 105 of the first sidewall 104.

However, when the gate portion 114 is in the open configuration, the cross-channel member 116 extends into the channel 110 but does not reach the first sidewall 104 to physically engage the channel-facing surface 105 of the first sidewall 104. Therefore, when the gate portion 114 is in the open configuration, a portion of an object may freely pass into or exit from the channel 110 between the distal end 117 of the cross-channel member 116 and the channel-facing surface 105 of the first sidewall 104. In particular, in some implementations, when the gate portion 114 is actuated from the closed configuration to the open configuration, the cross-channel member 116 can pivot or rotate upwards (e.g., clockwise for the orientation illustrated FIG. 1) toward a channel-ceiling such that the cross-channel member 116 extends into the channel 110 but does not reach the first sidewall 104 to physically engage the channel-facing surface 105 of the first sidewall 104.

In some implementations, as illustrated in FIG. 1, the channel-facing surface 105 of the first sidewall 104 includes a lip 120 that extends from the first sidewall 104 into the channel 110. When the gate portion 114 is in the closed configuration, the cross-channel member 116 extends across the channel 110 to physically engage the lip 120 of the first sidewall 104 or a portion of an object held between the cross-channel member 116 and the lip 120 of the first sidewall 104. For example, a lower surface of the distal end 117 of the cross-channel member 116 may rest upon or otherwise physically engage an upper surface of the lip 120, as illustrated in FIG. 1.

In some implementations of the present disclosure, the distal end 117 of the cross-channel member is rounded. In some implementations, the distal end 117 of the cross-channel member 116 has at least one of a texture or a material that grips the portion of the object held between the distal end 117 of the cross-channel member 116 and the first sidewall 104. For example, the distal end 117 of the cross-channel member 116 can have ridges, studs, prongs, and/or hooks to assist in engaging and/holding the portion of the object. As another example, the distal end 117 of the cross-channel member 116 can be made of or have disposed thereon rubber, soft plastic, or other griping materials. Likewise, the lip 120 or other portions of the first sidewall 104 may have such textures and/or materials in addition or alternatively to the cross-channel member 116.

In some implementations of the present disclosure, the gate portion 114 can be biased toward the closed configuration by gravity. Thus, for example, when the holder apparatus 100 is in an upright position, as illustrated in FIG. 1, the gate portion 114 can naturally return or otherwise be biased toward the closed configuration due to gravitational forces. Such natural return toward the closed configuration may assist in the initial retention of objects within the channel 110.

Furthermore, in some implementations, such as those depicted in FIGS. 1-3C, the holder apparatus 100 does not include any biasing elements such as springs, coils, elastic bands, or resiliently deformable elements. For example, one or both of the body portion 102 and the gate portion 114 can be substantially rigid (e.g., rigid pieces of plastic). Thus, the holder apparatus 100 does not include biasing elements which may suffer from degradation or loss of functionality over time.

In some implementations, the body portion 102 includes a ceiling portion 108 that forms a ceiling of the channel 110. The ceiling portion 108 can be physically coupled to the first sidewall 104 and the second sidewall 106. For example, the first sidewall 104 and the second sidewall 106 can respectively extend downwards from the ceiling portion 108. In other implementations, the first sidewall 104 and the second sidewall 106 may directly connect to each other without an explicit ceiling portion 108 (e.g., the body portion 102 can be V-shaped rather than U-shaped).

In some implementations, the body portion 102 is a first unitary piece of plastic. Likewise, the gate portion 114 can be a second unitary piece of plastic. For example, the body portion 102 and/or the gate portion 114 can each be unitary pieces of molded plastic or can be produced through other techniques such as three-dimensional printing. However, in other implementations, the body portion 102 and/or the gate portion 114 can be formed from multiple parts and/or made from materials other than plastic.

According to another aspect of the present disclosure, the holder apparatus 100 can further include at least one hook that extends from the body portion 102 and a first direction, where the first direction is opposite to a second direction in which the first sidewall 104 and the second sidewall 106 respectively extend. The at least one hook enables the holder apparatus 100 to be suspended from a cord, line, hanger, protrusion, pole, support hook, or other similar items.

As one example, as illustrated in FIG. 1, a first hook 122 and a second hook 124 extend from the ceiling portion 108 in a first direction which is opposite to a second direction in which the first sidewall 104 and the second sidewall 106 extend from the ceiling portion 108. The first hook 122 opposes the second hook 124 to form a second channel 126 therebetween. Furthermore, as illustrated in FIG. 1, the first hook 122 and the second hook 124 face in opposing directions. In particular, the first hook 122 and the second hook 124 face in opposing directions that are respectively parallel to the second channel 126. Stated differently, each of the first hook 122 and the second hook 124 include a neck portion that extends away from the ceiling portion 108 and a curved head portion that curves away from the neck portion back towards the ceiling portion 108 to define an opening between the head portion and a top surface of the ceiling portion 108. However, the openings respectively defined by the first hook 122 and the second hook 124 are on opposite sides of the top surface of the ceiling portion 108. For example, the first hook 122 faces the second sidewall 106 while the second hook 124 faces the first sidewall 104 (or vice versa).

Figure 3A:
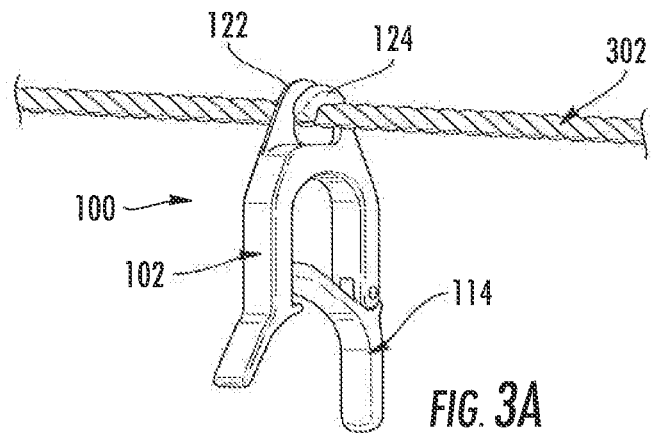
FIGS. 3A-3C depict the operation of an example holder apparatus according to example embodiments of the present disclosure.
Figure 3B:
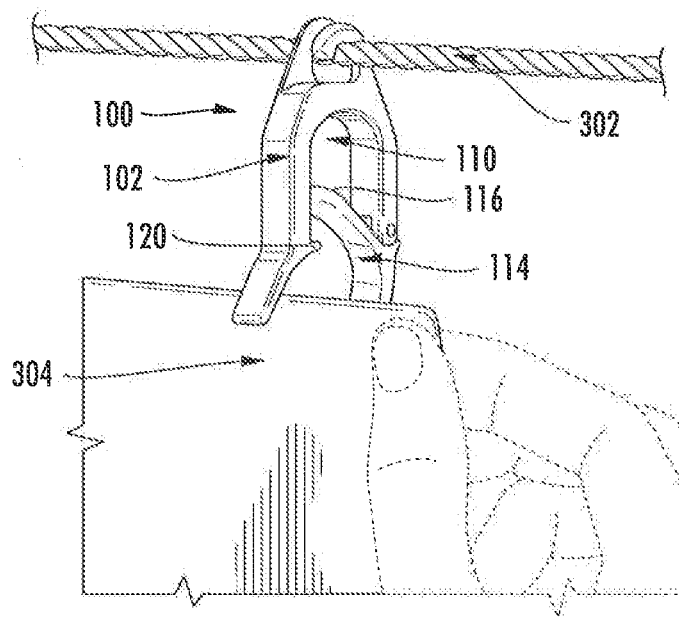
Figure 3C:
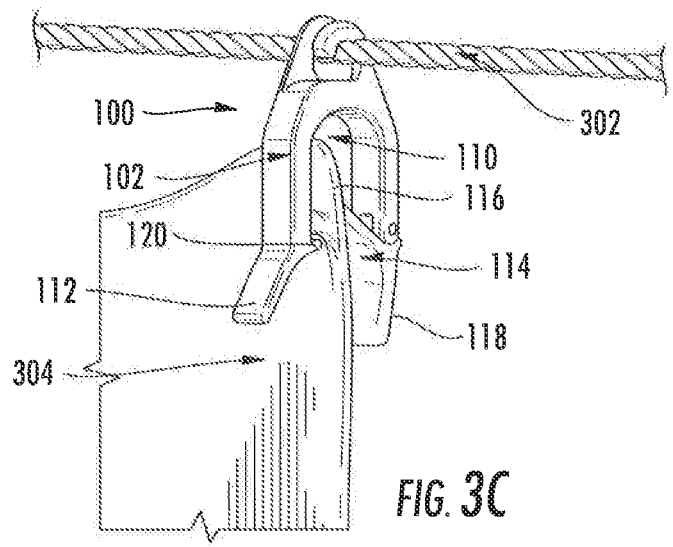

The example hook design discussed above and illustrated in FIG. 1 has the advantageous effect of enabling the holder apparatus 100 to be more securely mounted to or hung from a cord, line, hanger, pole, curtain rod, or other elongated object. In particular, to provide an example, the holder apparatus 100 is positioned so that an elongated object (e.g., cord, line, hanger, pole, curtain rod, etc.) is placed within the second channel 126 between the first hook 122 and the second hook 124. The holder apparatus 100 is then rotated (e.g., clockwise for the illustrated embodiment) so that the elongated object passes through the respective openings defined between the respective head portions of the first hook 122 and the second hook 124 and the top surface of the ceiling portion 108. As a result, the elongated object extends through a passageway 128 and the holder apparatus 100 is more securely mounted to or hung from the elongated object. Such configuration is illustrated in FIGS. 3A-3C, which will be discussed further below.

According to another aspect of the present disclosure, in some implementations, the gate portion 114 can include a first leg 118 that extends away from the second sidewall 106 and the cross-channel member 116. The first leg 118 can extend directly downwards or can extend downwards and at a slight angle away from the channel 110.

The first leg 118 can be movable by a user of the holder apparatus 100 to at least cause the gate portion 114 to move (e.g., pivot) from the closed configuration to the open configuration to release the portion of the object held between the cross cross-channel member 116 and the first sidewall 104. In particular, for example, the gate portion 114 can be rigid, such that when the user polls, presses, pinches, or otherwise causes the first leg 118 to move towards the channel, the cross-channel member 116 will disengage from the first sidewall 104 to release the object.

Thus, the first leg 118 enables simplified manipulation of the configuration of the gate portion 114 by the user to either permit an object to enter the channel 110 or release the object from the channel 110. However, user manipulation of the first leg 118 is not necessarily required to move the gate portion 114 between the closed configuration and the open configuration and vice versa. For example, a user may press an object upwards against the bottom surface of the cross-channel member 116 to cause the gate portion 114 to move from the closed configuration to the open configuration, thereby permitting the object to enter the channel 110.

Further, in some implementations, the body portion 102 can further have a second leg 112 that extends from the first sidewall 104. The second leg 112 can extend directly downwards or can extend downwards and at a slight angle away from the channel 110. In addition, the first leg 118 and the second leg 112 can be shaped and spaced to enable the user of the holder apparatus 100 to pinch or otherwise pull the first leg 118 toward the second leg 112 to cause the gate portion 114 to move (e.g., pivot) from the closed configuration to the open configuration. Thus, when the holder apparatus includes the second leg 112, the user is not required to precisely grip and manipulate the first leg 118, but instead, for example, can simply use 2 fingers to pinch the first leg 118 and the second leg 112, causing the first leg 118 to move towards the second leg 112, thereby causing the gate portion 114 to move from the closed configuration to the open configuration and release the object.

According to another aspect of the present disclosure, in implementations in which the gate portion 114 is pivotably or hingedly coupled to the second sidewall 106, the gate portion 114 and the second sidewall 106 can respectively include complementary hinge portions. In particular, as an example, and as best illustrated in FIG. 2, the second sidewall 106 can include a first hinge portion (generally indicated at 125) and the gate portion 114 can include a second hinge portion (generally indicated at 129). The second hinge portion 129 can be complementary to the first hinge portion 125. In some implementations, the second hinge portion 129 can be selectively insertable and removable from the first hinge portion 125. For example, in some implementations, the second hinge portion 129 can be selectively insertable and removable from the first hinge portion 125 via a snap fit.

In some implementations, as illustrated in FIG. 2, the second hinge portion 129 can include a cylinder 130 or other shape that protrudes from the cross-channel member 116. The second hinge portion 129 can further include a pair of shafts 132 and 134 that respectively extend from opposite ends of the cylinder 130. The first hinge portion 125 can include a cavity formed in the second sidewall 106. The cavity can be sized and shaped to receive the cylinder 130. The first hinge portion 125 can further include a third hook 126 fourth hook 128 sized and shaped to respectively receive the pair of shafts 132 and 134. For example, the hooks 126 and 128 can respectively receive the pair of shafts 132 and 134 in a snap fit fashion (e.g., the shafts 132 and 134 snap into place and remain rotatable within the center openings of the hooks 126 and 128).

FIGS. 3A-3C depict the operation of the example holder apparatus 100 according to example embodiments of the present disclosure. As shown in FIG. 3A, the holder apparatus can be suspended or otherwise hung from a line 302 or other rope, cord, rod, or other elongated object. The line 302 can pass through the passageway 128 discussed with reference to FIG. 1.

Referring now to FIG. 3B, a portion of an object 304 such as an item of clothing, a towel, a piece of paper, a photograph, a shower or window curtain, a hat, or other object can be moved upwards toward the holder apparatus 100. The gate portion 114 of the holder apparatus 100 can be moved from the closed configuration to the open configuration to permit at least a portion of the object 104 to pass between the cross-channel member 116 and the first sidewall to enter the channel 110. As one example, pressing the object 304 against the bottom surface of the cross-channel member 116 can cause the gate portion 114 to pivot into the open configuration. As another example, the user can manually move the first leg 118 to cause the gate portion 114 to pivot into the open configuration.

Once at least a portion of the object 304 has passed between the cross-channel member 116 and the first sidewall to enter the channel 110, the user can release the object 304. The gate portion 114, which can be biased toward the closed position by gravity, will naturally return to the closed configuration prior to the portion of the object 304 leaving the channel 110. Likewise, the portion of the object 304 that is within the channel 110 may also pull the cross-channel member downwards, causing the gate portion 114 to pivot back into the closed configuration.

Referring now to the FIG. 3C, as illustrated, the portion of the object 304 is firmly pressed or otherwise securely held between the cross-channel member 116 and the first sidewall of the body portion 102 of the holder apparatus 100. In particular, in the illustrated embodiment, the portion of the object 304 is firmly pressed or otherwise securely held between the cross-channel member 116 and the lip 120 of the first sidewall.

Furthermore, the weight of the object 304 and/or other forces which seek to cause the object 304 to leave or fall away from the holder apparatus 100 serve only to tighten the hold of the apparatus 100. In particular, as the portion of the object 304 within the channel 110 is pulled away or downwards, it naturally tightens the cross-channel member 116 against the lip 120. Thus, the holder apparatus 100 is designed to leverage natural mechanical and gravitational forces to securely hold the object 304, eliminating the need for biasing members such as springs, coils, elastic bands, and the like. In particular, any force applied to pull the object 304 away from the apparatus 100 serves only to tighten the grip of the apparatus 100 on the object 304.

To release the object 304 from the apparatus 100, the user simply pinches the first leg 118 toward the second leg 112 to move the gate portion 114 into the open configuration, thereby quickly and easily releasing the object 304 from the apparatus 100. Thus, the holder apparatus 100 of the present disclosure provides a simple, efficient, user-friendly, and durable solution for holding objects in a suspended state. The apparatus 100 relies on natural mechanical forces, not biasing members such as springs. Further, the apparatus 100 can hold an object (e.g., curtain) without requiring destructive holes to be formed in the object and without the risk that the object will slip off a hook.

Figure 4:
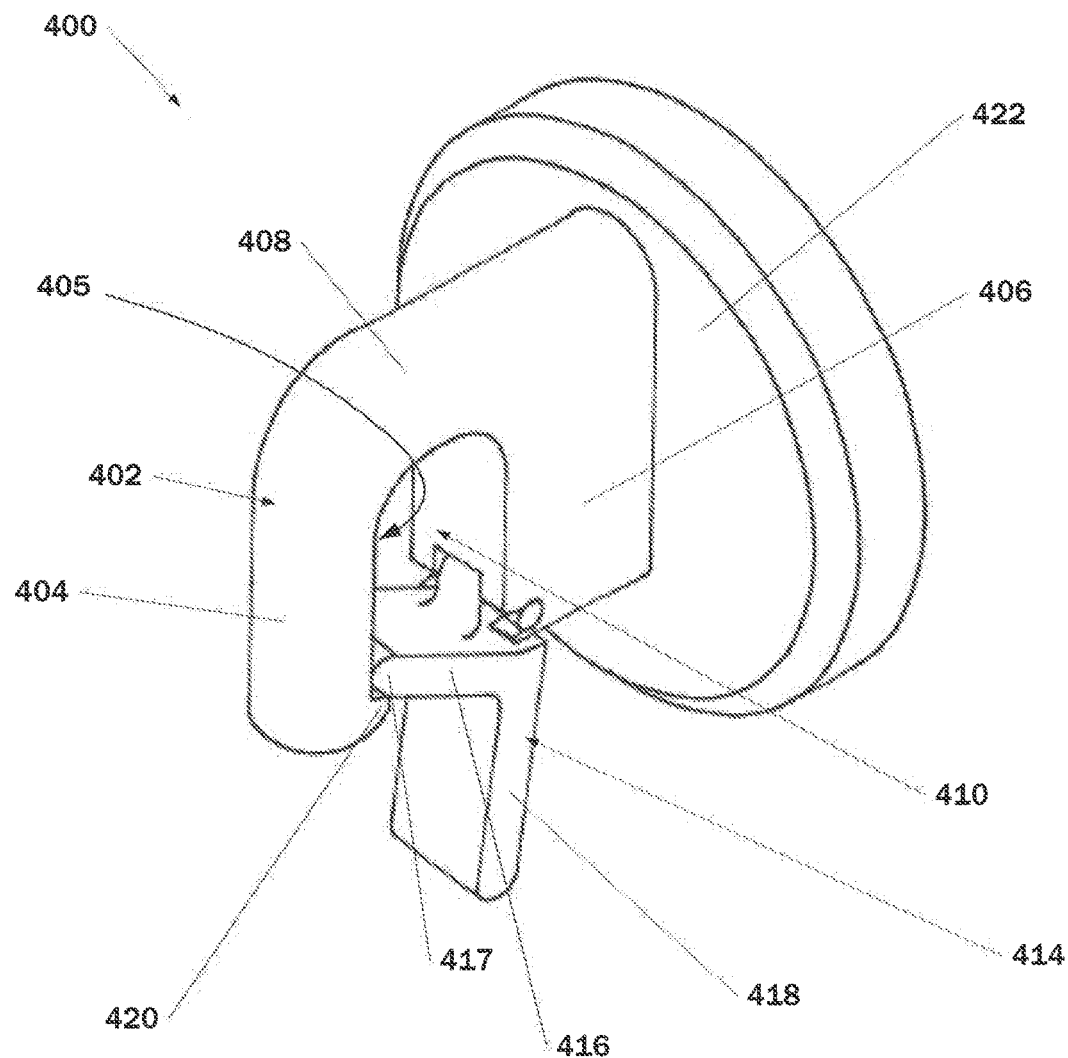
FIG. 4 depicts an isometric view of an example holder apparatus according to example embodiments of the present disclosure.
Figure 5:
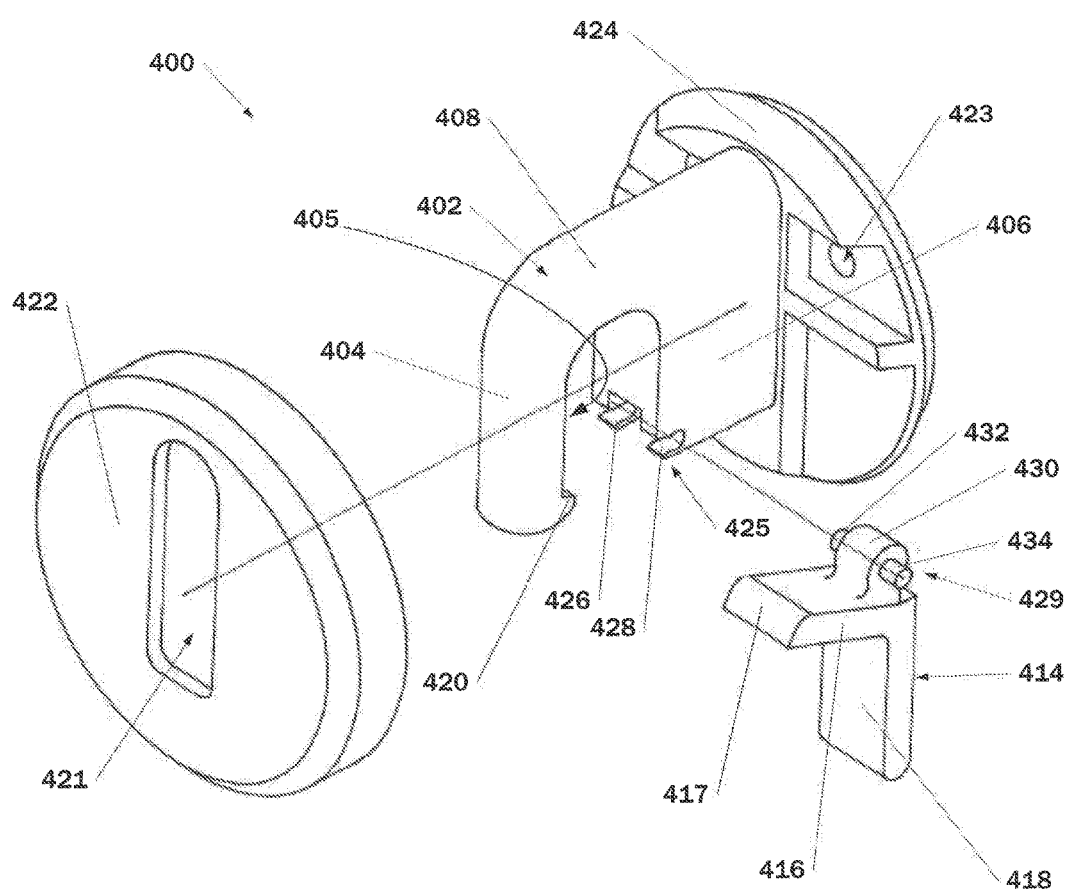
FIG. 5 depicts an exploded view of an example holder apparatus according to example embodiments of the present disclosure.

FIG. 4 depicts an isometric view of another example holder apparatus 400 according to example embodiments of the present disclosure. FIG. 5 depicts an exploded view of the example holder apparatus 400 according to example embodiments of the present disclosure.

The holder apparatus 400 includes a body portion 402 and a gate portion 414. The body portion 402 includes a first sidewall 404 and a second sidewall 406. The second sidewall 406 opposes the first sidewall 404 to form a channel 410 therebetween. During use of the holder apparatus 400, a portion of an object can be placed into and held within the channel 410.

At least in use, the gate portion 414 is physically coupled to the second sidewall 406 of the body portion 402. At least in use, the gate portion 414 is movable between an open configuration and a closed configuration. For example, the gate portion 414 can be pivotably physically coupled to the second sidewall 406 and can be pivotable between the open configuration and the closed configuration (e.g., freely pivotable). In FIG. 4, the gate portion 414 is illustrated in the closed configuration.

More particularly, the gate portion 414 can include a cross-channel member 416 that, when the gate portion 414 is in the closed configuration, extends across an entire width of the channel 410 to physically engage the first sidewall 404 or a portion of an object held between the cross-channel member 416 and the first sidewall 405. In particular, for example, when the gate portion 414 is in the closed configuration, the cross-channel member 416 can extend across the entire width of the channel 410 to physically engage a channel-facing surface 405 of the first sidewall 404 or a portion of an object held between the cross-channel member 416 and the channel-facing surface 405 of the first sidewall 404. For example, a distal end 417 of the cross-channel member 416 can press against or otherwise physically engage the channel-facing surface 405 of the first sidewall 404.

However, when the gate portion 414 is in the open configuration, the cross-channel member 416 extends into the channel 410 but does not reach the first sidewall 404 to physically engage the channel-facing surface 405 of the first sidewall 404. Therefore, when the gate portion 414 is in the open configuration, a portion of an object may freely pass into or exit from the channel 410 between the distal end 417 of the cross-channel member 416 and the channel-facing surface 405 of the first sidewall 404. In particular, in some implementations, when the gate portion 414 is actuated from the closed configuration to the open configuration, the cross-channel member 416 can pivot or rotate upwards (e.g., clockwise for the orientation illustrated in FIG. 4) toward a channel-ceiling such that the cross-channel member 416 extends into the channel 410 but does not reach the first sidewall 404 to physically engage the channel-facing surface 405 of the first sidewall 404.

In some implementations, as illustrated in FIG. 4, the channel-facing surface 405 of the first sidewall 404 includes a lip 420 that extends from the first sidewall 404 into the channel 410. When the gate portion 414 is in the closed configuration, the cross-channel member 416 extends across the channel 410 to physically engage the lip 420 of the first sidewall 404 or a portion of an object held between the cross-channel member 416 and the lip 420 of the first sidewall 404. For example, a lower surface of the distal end 417 of the cross-channel member 416 may rest upon or otherwise physically engage an upper surface of the lip 420, as illustrated in FIG. 4.

In some implementations of the present disclosure, the distal end 417 of the cross-channel member is rounded. In some implementations, the distal end 417 of the cross-channel member 416 has at least one of a texture or a material that grips the portion of the object held between the distal end 417 of the cross-channel member 416 and the first sidewall 404. For example, the distal end 417 of the cross-channel member 416 can have ridges, studs, prongs, and/or hooks to assist in engaging and/or holding the portion of the object. As another example, the distal end 417 of the cross-channel member 416 can be formed from or have disposed thereon rubber, soft plastic, or other griping materials. Likewise, the lip 420 or other portions of the first sidewall 404 may have such textures and/or materials in addition or alternatively to the cross-channel member 416.

In some implementations of the present disclosure, the gate portion 414 can be biased toward the closed configuration by gravity. Thus, for example, when the holder apparatus 400 is in an upright position, as illustrated in FIG. 4, the gate portion 414 can naturally return or otherwise be biased toward the closed configuration due to gravitational forces. Such natural return toward the closed configuration may assist in the initial retention of objects within the channel 410.

Furthermore, in some implementations, such as those depicted in FIGS. 4-6B, the holder apparatus 400 does not include any biasing elements such as springs, coils, elastic bands, or resiliently deformable elements. For example, one or both of the body portion 402 and the gate portion 414 can be substantially rigid (e.g., rigid pieces of plastic). Thus, the holder apparatus 400 does not include biasing elements which may suffer from degradation or loss of functionality over time.

In some implementations, the body portion 402 includes a ceiling portion 408 that forms a ceiling of the channel 410. The ceiling portion 408 can be physically coupled to the first sidewall 404 and the second sidewall 406. For example, the first sidewall 404 and the second sidewall 406 can respectively extend downwards from the ceiling portion 408. In other implementations, the first sidewall 404 and the second sidewall 406 may directly connect to each other without an explicit ceiling portion 408 (e.g., the body portion 402 can be V-shaped rather than U-shaped).

In some implementations, the body portion 402 is a first unitary piece of plastic. Likewise, the gate portion 414 can be a second unitary piece of plastic. For example, the body portion 402 and/or the gate portion 414 can each be unitary pieces of molded plastic or can be produced through other techniques such as three-dimensional printing. However, in other implementations, the body portion 402 and/or the gate portion 414 can be formed from multiple parts and/or made from materials other than plastic.

According to another aspect of the present disclosure, in some implementations, the gate portion 414 can include a first leg 418 that extends away from the second sidewall 406 and the cross-channel member 416. The first leg 418 can extend directly downwards or can extend downwards and at a slight angle away from the channel 410.

The first leg 418 can be movable by a user of the holder apparatus 400 to at least cause the gate portion 414 to move (e.g., pivot) from the closed configuration to the open configuration to release the portion of the object held between the cross cross-channel member 416 and the first sidewall 404. In particular, for example, the gate portion 414 can be rigid, such that when the user polls, presses, pinches, or otherwise causes the first leg 418 to move towards the channel, the cross-channel member 416 will disengage from the first sidewall 404 to release the object.

Thus, the first leg 418 enables simplified manipulation of the configuration of the gate portion 414 by the user to either permit an object to enter the channel 410 or release the object from the channel 410. However, user manipulation of the first leg 418 is not necessarily required to move the gate portion 414 between the closed configuration and the open configuration and vice versa. For example, a user may press an object upwards against the bottom surface of the cross-channel member 416 to cause the gate portion 414 to move from the closed configuration to the open configuration, thereby permitting the object to enter the channel 410.

According to another aspect of the present disclosure, in implementations in which the gate portion 414 is pivotably or hingedly coupled to the second sidewall 406, the gate portion 414 and the second sidewall 406 can respectively include complementary hinge portions. In particular, as an example, and as best illustrated in FIG. 5, the second sidewall 406 can include a first hinge portion (generally indicated at 425) and the gate portion 414 can include a second hinge portion (generally indicated at 429). The second hinge portion 429 can be complementary to the first hinge portion 425. In some implementations, the second hinge portion 429 can be selectively insertable and removable from the first hinge portion 425. For example, in some implementations, the second hinge portion 429 can be selectively insertable and removable from the first hinge portion 425 via a snap fit.

In some implementations, as illustrated in FIG. 5, the second hinge portion 429 can include a cylinder 430 or other shape that protrudes from the cross-channel member 416. The second hinge portion 429 can further include a pair of shafts 432 and 434 that respectively extend from opposite ends of the cylinder 430. The first hinge portion 425 can include a cavity formed in the second sidewall 406. The cavity can be sized and shaped to receive the cylinder 430. The first hinge portion 425 can further include a third hook 426 fourth hook 428 sized and shaped to respectively receive the pair of shafts 432 and 434. For example, the hooks 426 and 428 can respectively receive the pair of shafts 432 and 434 in a snap fit fashion (e.g., the shafts 432 and 434 snap into place and remain rotatable within the center openings of the hooks 426 and 428).

In some implementations, as best illustrated in FIG. 5, the holder apparatus 400 can further include a back plate 424 and a cover plate 422. The body portion 402 of the holder apparatus 400 can be mounted on the back plate 424. For example, one or more fasteners (e.g., screws) can be inserted from a rear of the back plate 424 and engage with the body portion 402 (e.g., within the second sidewall 406). The cover plate 422 can have an opening 421 that is sized and shaped to allow the body portion to pass therethrough. Further, the cover plate 422 can be sized and shaped to circumferentially enclose the back plate 424.

As one example installation, the body portion 102 can be mounted to the back plate 424 as described above. The back plate 424 can then be mounted to a surface such as a wall, door, etc. via one or more fasteners that extend through openings (e.g., opening 423) in the back plate 424 and into the surface. The cover plate 424 can then be slid over the assembly with the body portion 402 passing through the center opening 421 of the cover plate 422. The cover plate 422 can snap into place and circumferentially enclose the back plate 424. In another example installation illustrated in FIG. 6A, one or more fasteners 604 can extend through the cover plate 422 as well as the back plate 424 to mount the apparatus 400 to a surface 602.

Figure 6B:
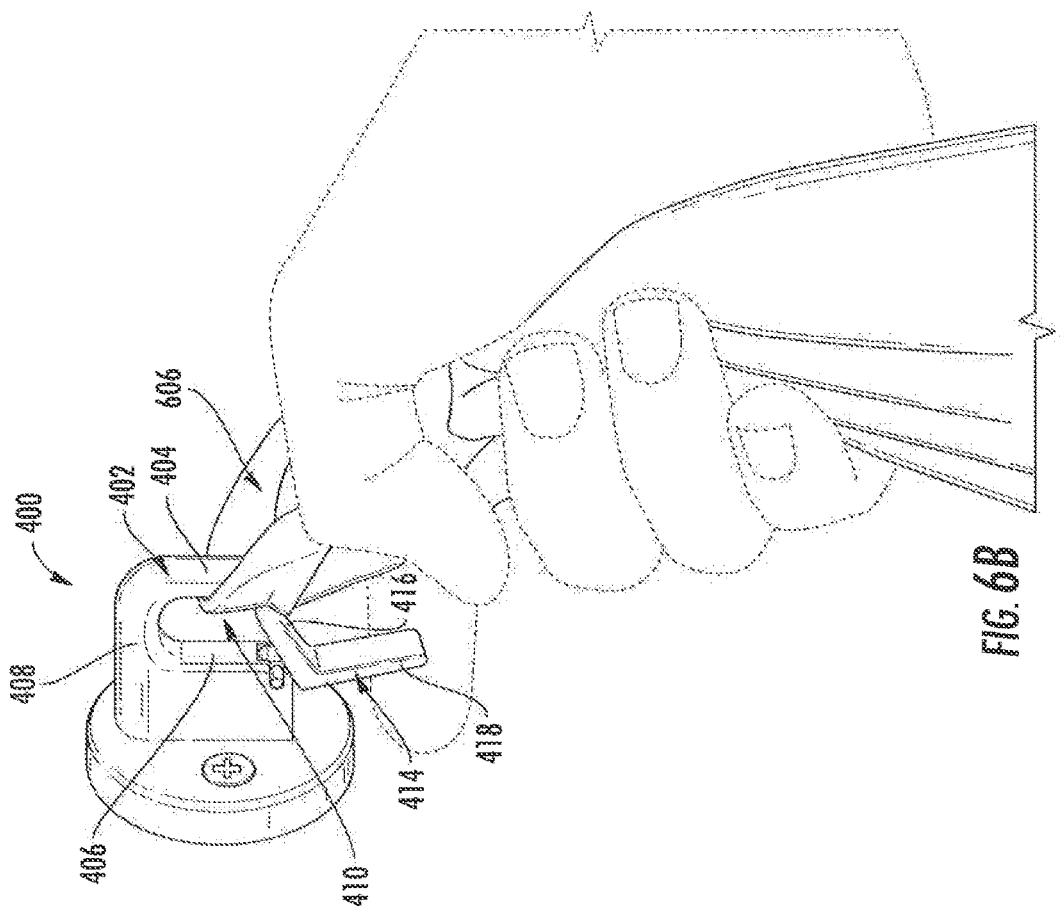
FIGS. 6A-6B depict the operation of an example holder apparatus according to example embodiments of the present disclosure.
Figure 6A:
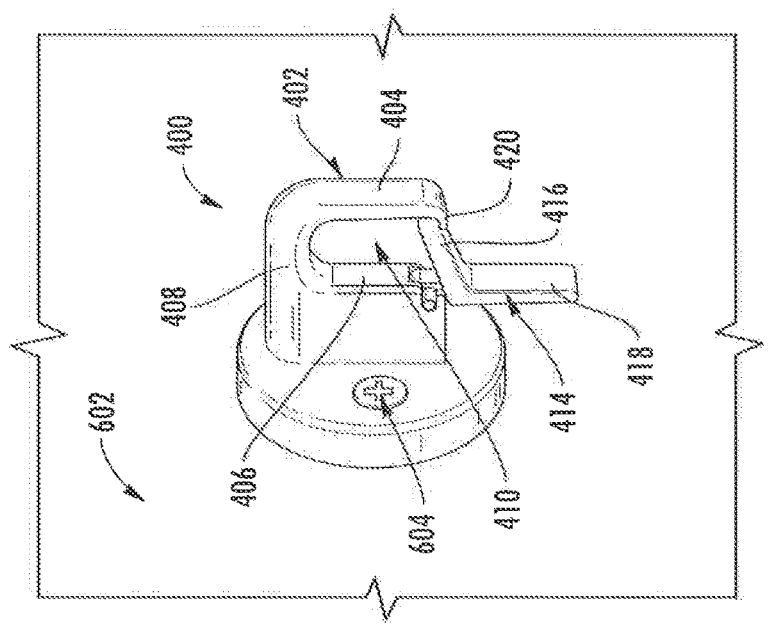

FIGS. 6A-6B depict the operation of the example holder apparatus 400 according to example embodiments of the present disclosure. As shown in FIG. 6A, the holder apparatus 400 can be mounted to a surface 602 such as a wall, door, desk, ceiling, etc. One or more fasteners 604 (e.g., screws, nails, etc.) can be used to fasten the holder apparatus 400 to the surface 602.

A portion of an object 606 such as an item of clothing, a towel, a piece of paper, a photograph, a shower or window curtain, a hat, a jacket, or other object can be moved upwards toward the holder apparatus 400. The gate portion 414 of the holder apparatus 400 can be moved from the closed configuration to the open configuration to permit at least a portion of the object 404 to pass between the cross-channel member 416 and the first sidewall to enter the channel 140. As one example, pressing the object 606 against the bottom surface of the cross-channel member 416 can cause the gate portion 414 to pivot into the open configuration. As another example, the user can manually move the first leg 418 to cause the gate portion 414 to pivot into the open configuration.

Once at least a portion of the object 606 has passed between the cross-channel member 416 and the first sidewall to enter the channel 140, the user can release the object 606. The gate portion 414, which can be biased toward the closed position by gravity, will naturally return to the closed configuration prior to the portion of the object 606 leaving the channel 140. Likewise, the portion of the object 606 that is within the channel 140 may also pull the cross-channel member downwards, causing the gate portion 414 to pivot back into the closed configuration.

After insertion and release of the object, the portion of the object 606 is firmly pressed or otherwise securely held between the cross-channel member 416 and the first sidewall of the body portion 402 of the holder apparatus 400. In particular, in the illustrated embodiment, the portion of the object 606 is firmly pressed or otherwise securely held between the cross-channel member 416 and the lip 420 of the first sidewall.

Furthermore, the weight of the object 606 and/or other forces which seek to cause the object 606 to leave or fall away from the holder apparatus 400 serve only to tighten the hold of the apparatus 400. In particular, as the portion of the object 606 within the channel 140 is pulled away or downwards, it naturally tightens the cross-channel member 416 against the lip 420. Thus, the holder apparatus 400 is designed to leverage natural mechanical and gravitational forces to securely hold the object 606, eliminating the need for biasing members such as springs, coils, elastic bands, and the like. In particular, any force applied to pull the object 606 away from the apparatus 400 serves only to tighten the grip of the apparatus 400 on the object 606.

As illustrated in FIG. 6B, to release the object 606 from the apparatus 400, the user simply pulls the first leg 418 forward to move the gate portion 414 into the open configuration, thereby quickly and easily releasing the object 606 from the apparatus 400. Thus, the holder apparatus 400 of the present disclosure provides a simple, efficient, user-friendly, and durable solution for holding objects in a suspended state. The apparatus 400 relies on natural mechanical forces, not biasing members such as springs. Further, the apparatus 400 can hold an object (e.g., towel) without requiring destructive holes to be formed in the object and without the risk that the object will slip off a hook.

While example embodiments of the present disclosure have been described and illustrated according to their assembled and operative forms, the holder apparatuses of the present disclosure can also be manufactured, distributed, sold, etc. as multiple parts or pieces (e.g., "a kit") that are subsequently assembled by a consumer, end-user of the apparatus, or other downstream entity. Thus, the present disclosure covers such holder apparatus kits.

One example holder apparatus kit includes a body portion of the holder apparatus. The body portion includes a first sidewall and a second sidewall that opposes the first sidewall to form a channel therebetween. The kit includes a gate portion of the holder apparatus. The gate portion is selectively physically coupleable to the second sidewall of the body portion of the holder apparatus. When the gate portion is physically coupled to the second sidewall of the body portion, the gate portion is movable between an open configuration and a closed configuration. The gate portion includes a cross-channel member that, when the gate portion is physically coupled to the second sidewall of the body portion and in the closed configuration, extends across an entire width of the channel to physically engage a channel-facing surface of the first sidewall or a portion of an object held between the cross-channel member and the channel-facing surface of the first sidewall. The kit can optionally further include a back plate on which the body portion is selectively mountable. The kit can optionally further include a cover plate that has an opening sized and shaped to allow the body portion to pass therethrough. The cover plate can be sized and shaped to circumferentially enclose the back plate.

While the present subject matter has been described in detail with respect to various specific example embodiments thereof, each example is provided by way of explanation, not limitation of the disclosure. Those skilled in the art, upon attaining an understanding of the foregoing, may readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, the present disclosure covers such alterations, variations, and equivalents.

What is claimed is:

1. A holder apparatus, comprising:
   a body portion comprising:
      a first sidewall; and
      a second sidewall that opposes the first sidewall to form a channel therebetween; and
   a gate portion that is, at least in use, physically coupled to the second sidewall of the body portion and movable between an open configuration and a closed configuration;
   wherein the gate portion comprises a cross-channel member that, when the gate portion is in the closed configuration and in use, extends across an entire width of the channel to physically engage a portion of an object positioned between the cross-channel member and a channel-facing surface of the first sidewall to hold the object in place.

2. The holder apparatus of claim 1, wherein the gate portion is, at least in use, pivotably coupled to the second sidewall of the body portion and pivotable between the open configuration and the closed configuration.

3. The holder apparatus of claim 1, wherein, when the gate portion is in the open configuration, the cross-channel member extends into the channel but does not reach the first sidewall to physically engage the channel-facing surface of the first sidewall.

4. The holder apparatus of claim 1, wherein the gate portion is biased toward the closed configuration by gravity.

5. The holder apparatus of claim 1, wherein:
   the body portion is rigid;
   the gate portion is rigid; and
   the holder apparatus does not include any biasing elements.

6. The holder apparatus of claim 1, wherein:
   the first sidewall has a lip that extends from the first sidewall into the channel; and
   when the gate portion is in the closed configuration and in use, the cross-channel member extends across the channel to physically engage the portion of the object positioned between the cross-channel member and the lip of the first sidewall to hold the object in place.

7. The holder apparatus of claim 1, wherein:
   the body portion comprises a first unitary piece of plastic;
   the gate portion comprises a second unitary piece of plastic.

8. The holder apparatus of claim 1, wherein:
   the body portion further comprises a ceiling portion that forms a ceiling of the channel;
   the ceiling portion is physically coupled to the first sidewall and the second sidewall; and
   the first sidewall and the second sidewall respectively extend downwards from the ceiling portion.

9. The holder apparatus of claim 8, further comprising:
   at least one hook that extends from the ceiling portion in a first direction, the first direction opposite to a second direction in which the first sidewall and the second sidewall respectively extend from the ceiling portion.

10. The holder apparatus of claim 9, wherein:
    the at least one hook comprises a first hook and a second hook that opposes the first hook to form a second channel therebetween,
    the first hook and the second hook respectively extend in the first direction; and
    the first hook and the second hook face in opposing directions.

11. The holder apparatus of claim 1, wherein the gate portion further comprises a first leg that extends away from the second sidewall and the cross-channel member, the first leg movable by a user of the holder apparatus to at least cause the gate portion to pivot from the closed configuration to the open configuration to release the object.

12. The holder apparatus of claim 11, further comprising:
    a second leg that extends from the first sidewall, the second leg opposite the channel from the first leg, the first leg and the second leg shaped and spaced to enable the user of the holder apparatus to pinch the first leg toward the second leg to cause the gate portion to pivot from the closed configuration to the open configuration to release the object.

13. The holder apparatus of claim 1, wherein:
    when the gate portion is in the closed configuration and in use, a distal end of the cross-channel member physically engages the portion of the object positioned between the distal end of the cross-channel member and the channel-facing surface of the first sidewall; and
    the distal end of the cross-channel member has at least one of a texture or a material that grips the portion of the object positioned between the distal end of the cross-channel member and the channel-facing surface of the first sidewall to hold the object in place.

14. The holder apparatus of claim 1, wherein:
    the second sidewall comprises a first hinge portion; and
    the gate portion comprises a second hinge portion that is complementary to the first hinge portion, the second hinge portion selectively insertable and removable from the first hinge portion.

15. The holder apparatus of claim 14, wherein:
    the second hinge portion comprises:
       a cylinder that protrudes from the cross-channel member; and
       a pair of shafts that respectively extend from opposite ends of the cylinder; and
    the first hinge portion comprises:
       a cavity formed in the second sidewall to receive the cylinder; and
       a third hook and a fourth hook sized and shaped to respectively receive the pair of shafts in a snap fit fashion.

16. The holder apparatus of claim 1, further comprising:
    a back plate on which the body portion is mounted; and
    a cover plate that has an opening sized and shaped to allow the body portion to pass therethrough.

17. The holder apparatus of claim 1, wherein:
    the body portion is U-shaped; and
    the gate portion is L-shaped.

18. A kit for a holder apparatus, the kit comprising:
    a body portion of the holder apparatus, the body portion comprising:
       a first sidewall; and
       a second sidewall that opposes the first sidewall to form a channel therebetween; and
    a gate portion of the holder apparatus, the gate portion selectively physically coupleable to the second sidewall of the body portion of the holder apparatus;

wherein, when the gate portion is physically coupled to the second sidewall of the body portion, the gate portion is movable between an open configuration and a closed configuration; and wherein the gate portion comprises a cross-channel member that, when the gate portion is physically coupled to the second sidewall of the body portion, in the closed configuration, and in use, extends across an entire width of the channel to physically engage a portion of an object positioned between the cross-channel member and a channel-facing surface of the first sidewall to hold the object in place.

19. The kit of claim 18, further comprising:
a back plate on which the body portion is mountable; and
a cover plate that has an opening sized and shaped to allow the body portion to pass therethrough.

20. A holder apparatus, comprising:
a body portion comprising:
   a first sidewall;
   a second sidewall that opposes the first sidewall to form a first channel therebetween; and
   a first hook and a second hook that extend from a top of the body portion, the first hook and the second hook opposite a depth of the body portion to each other to form a second channel therebetween, and wherein the first hook and the second hook face in opposing directions that are respectively parallel to the second channel; and
a gate portion that is, at least in use, physically coupled to the second sidewall of the body portion and movable between an open configuration and a closed configuration;
wherein the gate portion comprises a cross-channel member that, when the gate portion is physically coupled to the second sidewall and in the closed configuration, extends across an entire width of the first channel to physically engage a channel-facing surface of the first sidewall or a portion of an object held between the cross-channel member and the channel-facing surface of the first sidewall.

21. The kit of claim 18, wherein the holder apparatus does not include any biasing elements.

22. The holder apparatus of claim 20, wherein the holder apparatus does not include any biasing elements.

23. A holder apparatus, comprising:
a body portion comprising:
   a first sidewall; and
   a second sidewall that opposes the first sidewall to form a channel therebetween; and
a gate portion that is, at least in use, physically coupled to the second sidewall of the body portion and movable between an open configuration and a closed configuration;
wherein the gate portion comprises a cross-channel member that, when the gate portion is in the closed configuration, extends across an entire width of the channel to physically engage a channel-facing surface of the first sidewall or a portion of an object held between the cross-channel member and the channel-facing surface of the first sidewall;
wherein the second sidewall comprises a first hinge portion;
wherein the gate portion comprises a second hinge portion that is complementary to the first hinge portion, the second hinge portion selectively insertable and removable from the first hinge portion;
wherein the second hinge portion comprises:
   a cylinder that protrudes from the cross-channel member; and
   a pair of shafts that respectively extend from opposite ends of the cylinder; and
wherein the first hinge portion comprises:
   a cavity formed in the second sidewall to receive the cylinder; and
   a pair of hooks sized and shaped to respectively receive the pair of shafts in a snap fit fashion.

\* \* \* \* \*